(No Model.) 2 Sheets—Sheet 1.
W. W. TUCKER.
THREAD CUTTING MACHINE.
No. 595,798. Patented Dec. 21, 1897.
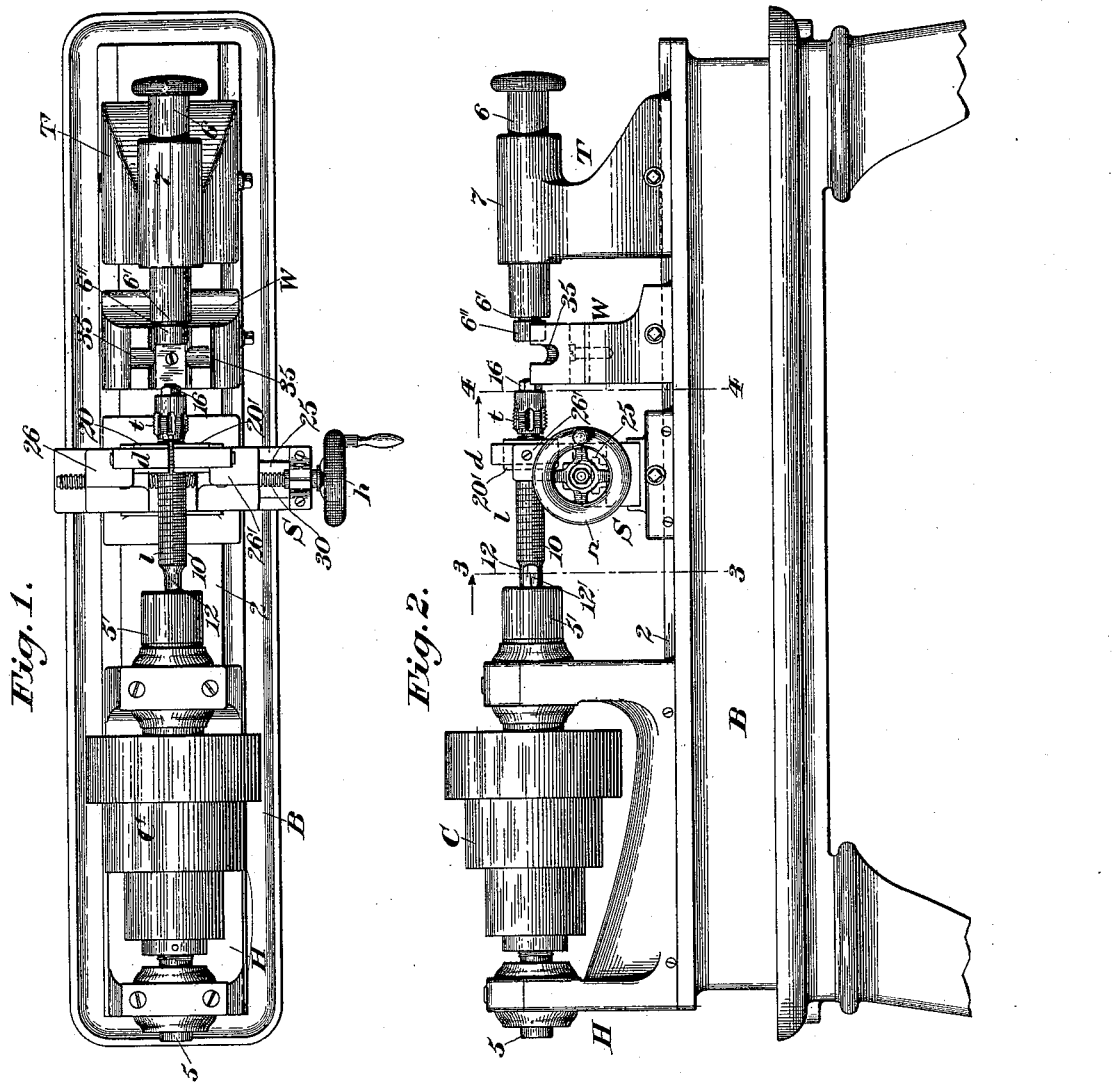
Witnesses:
O. W. Smith
Fred. J. Dole.
Inventor:
William W. Tucker
By his Attorney,
F. A. Richards.

(No Model.) 2 Sheets—Sheet 2.
W. W. TUCKER.
THREAD CUTTING MACHINE.
No. 595,798. Patented Dec. 21, 1897.
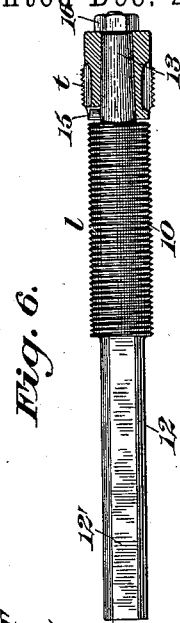
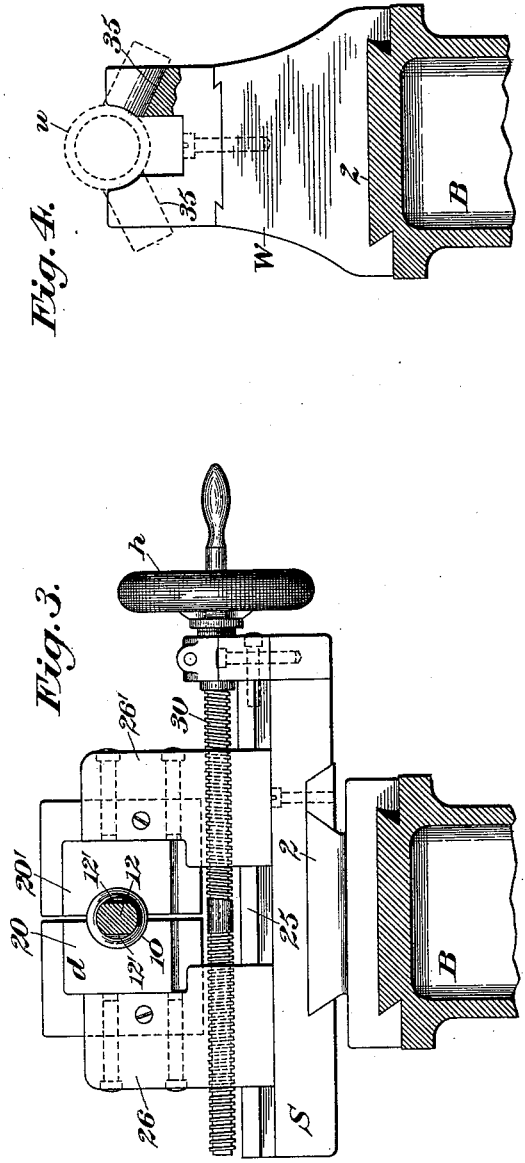
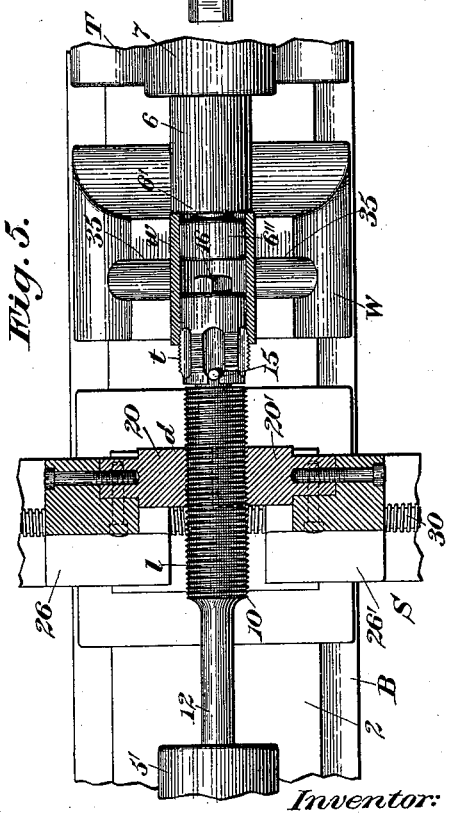
Witnesses:
C. W. Smith
Fred J. Dole
Inventor:
William W. Tucker
By his Attorney,
F. H. Richards

United States Patent Office.

WILLIAM W. TUCKER, OF HARTFORD, CONNECTICUT.

THREAD-CUTTING MACHINE.

SPECIFICATION forming part of Letters Patent No. 595,798, dated December 21, 1897.

Application filed September 27, 1897. Serial No. 653,175. (No model.)

*To all whom it may concern:*

Be it known that I, WILLIAM W. TUCKER, a citizen of the United States, residing in Hartford, in the county of Hartford and State of Connecticut, have invented certain new and useful Improvements in Thread-Cutting Machines, of which the following is a specification.

This invention relates to thread-cutting machines, and especially to tapping-machines, for cutting internal screw-threads; and it has for its main object the provision of an improved machine of this class, preferably of the horizontal type, in which the thread-cutter or tap while rotating will be advanced along the work by means of a pair of complementary threaded members, to one of which the cutter is secured, while the other constitutes a resistance-driver for actuating the threaded cutter-carrying member.

In the preferred form of my invention, which is illustrated in the drawings forming part of this application, this mechanism is especially designed and intended as a means for tapping or threading such parts as nuts, vehicle-hubs, &c., and embodies an internally-threaded resistance-driving member and an externally-threaded driven member coöperative therewith and in the form of a lead-screw carrying the tap and having screw-threads of the same pitch as the teeth of the tap.

In order that the work, which should of course be fixed on some suitable support or holder, may be removed readily from the machine without rendering it necessary to reverse the rotation of the lead-screw and run it out of the work, the threaded portion of this screw will preferably be of smaller diameter than the diameter of the tap carried thereby and will also have a shank of smaller diameter than its body portion, this lead-screw being so constructed that the tap may be run through the work and the work slipped off from the rear end or shank of the lead-screw and thus removed from the machine.

In the drawings accompanying and forming part of this specification, Figure 1 is a plan of a horizontal tapping-machine constructed in accordance with my present improvements. Fig. 2 is a side elevation of the same. Fig. 3 is an enlarged transverse section of the same, the section being taken on the line 3 3, Fig. 2, illustrating the manner in which the lead-screw is engaged by the internal threads of a pair of separable and transversely-adjustable jaws hereinafter more particularly described. Fig. 4 is an enlarged transverse section of the machine, the section being taken on the line 4 4, Fig. 2, illustrating the manner in which the work is supported by the work holder or rest. Fig. 5 is an enlarged sectional plan of the central portion of the machine, illustrating the manner in which the lead-screw and the internally-threaded resistance-driver therefor coöperate with each other and with the dead-spindle on the tail-stock of the machine; and Fig. 6 is a detail sectional side view illustrating the feed member or lead-screw and the tap carried and actuated thereby.

Similar characters designate like parts in all the figures of the drawings.

As to many of the features of my improved thread-cutting or tapping machine the construction thereof is substantially similar to that of corresponding parts of machines of this class now in general use. The several working parts may be mounted in the usual manner upon a bed, such as B, which in turn will carry on the usual way 2 a head-stock H and a tail-stock T, both of which may be of any suitable construction.

When the machine is in use, the adjustable tail-stock will of course be secured to the ways of the bed, so as to prevent sliding movement of such stock.

In the construction shown herein this machine also has supported on the ways 2 a slide-rest, such as S, and a work-rest or work-holder, (indicated in a general way by W.) Both the slide-rest and the work-holder are adjustable on the ways of the bed; but when the machine is in operation they should be securely clamped in place in some suitable manner.

The head-stock carries in bearings thereon in the well-known manner a rotary driving member or live-spindle, (indicated herein by 5,) this live-spindle having thereon the usual step-cones, (designated herein by C,) by means of which the live-spindle will of course be rotated at the desired speed. The tail-stock carries in a bearing thereon in a substantially similar manner the dead-spindle 6, which in this case is supported so that it may slide freely in the bearing 7. At its inner end the dead-spindle will preferably have a stop-shoulder 6' and a centering device, such as 6'', usually of smaller diameter than the main portion of the dead-spindle, for the purpose of engaging the work. In the present instance this centering device will be of the same external diameter as the internal diameter of the bore in the work and will pass into the work to hold and center the same.

The thread cutter or tap, by means of which the work is threaded, should be supported for rotation in unison with the live-spindle or rotary driving member of the machine, but should be free to move longitudinally relatively thereto. The threaded member which carries the cutter is intended to coact with a complementary threaded member in such a manner that the cutter-carrying member during its rotation in unison with the live-spindle will be advanced by such complementary threaded member, which latter will constitute a resistance-driver for moving the thread-cutter and its carrier longitudinally toward the work.

The cutter-carrier or tap-carrier will usually be in the form of a lead-screw—such, for instance, as that shown at $l$—having an externally-threaded body portion 10, a reduced shank 12, and a preferably tapered point 13, on which the tap may be secured. In order that this lead-screw may be properly supported, so as to rotate with the rotary driving member or live-spindle, I prefer to slab off the sides of the shank 12, as shown at 12', and retain the shank in position in a bushing in the enlarged portion 5' of the rotary driving member 5, which bushing should have an internal opening corresponding in contour (not shown) to the external contour of the shank 12. It will be obvious, however, that the lead-screw and the rotary driving member may be connected in any suitable manner which will permit of longitudinal movement of the screw while rotating with its driving member.

The thread-cutter which I usually employ will be in the form of a tap—such, for instance, as that shown at $t$—and this tap may be of any suitable construction, but will preferably be of greater diameter than the body portion of the lead-screw in order that the work may be slipped off over the body and the shank of such lead-screw when the tap shall have passed entirely through the work. This tap may advantageously have a slightly-tapered bore in order that it may be wedged firmly in place upon the end of the lead-screw, and it may also be held thereto by a pin-and-slot connection, such as is illustrated at 15, Figs. 5 and 6, secured against endwise movement, as by means of a stop-nut 16.

The advancing movement of the cutter-carrier or tap-carrier is intended to be derived from a complementary threaded member or jaw (designated in a general way by $d$) which when the machine is in operation will be fixed thereon, so as to form a resistance-driver, and this complementary member or jaw will preferably be internally screw-threaded to correspond to the external threads of the lead-screw and to engage with such last-mentioned threads. In the present instance this threaded resistance-driver will be divided and will have, preferably, a pair of separable jaws—such, for instance, as those shown at 20 and 20'—and these will be movable toward and from each other to permit the lead-screw to be grasped and released readily and without loss of time. These members may be of bronze metal or of any other material suitable for coöperating with the lead-screw to advance the latter.

The slide-rest S may have thereon a transverse way 25, on which will be mounted a pair of feed-slides, such as those indicated herein at 26 and 26', and to these feed-slides the jaws 20 and 20' should be secured so as to be practically rigid therewith, they being so positioned that when they engage the lead-screw they will form complementary jaws coöperative for advancing the screw. Obviously the two feed-slides, and hence the complementary jaws 20 and 20', should be adjustable transversely of the slide-rest, so that the two members of the jaw may be moved toward and from each other. For the purpose of effecting this adjustment I have illustrated at 30 (see Fig. 3) the usual right-and-left-hand adjusting feed-screw for operating the slides 26 and 26', this adjusting-screw being operated in some suitable manner—as, for example, by means of the hand-wheel $h$. It will be clear that by turning this wheel the two complementary jaws 20 and 20' may be moved quickly into engagemet with the lead-screw or withdrawn therefrom to permit removal of the latter and of the work.

The material or work being operated upon and indicated herein by $w$ may be supported in any suitable manner; but in this instance I have shown at W a work-holder especially adapted for retaining in position thereon cylindrical members having arms projecting therefrom — such, for example, as bicycle crank-hangers having tube-sockets projecting therefrom. By referring to Figs. 2, 4, and 5 it will be seen that this work-holder is in two parts, the upper one of which has a pair of transverse inclined grooves or ways 35 35, which should be of the same shape and size and disposed at the same angle as the arms projecting from the work, in order that the latter may be positioned properly longitudinally of the machine.

The centering of the work may be effected, in the manner hereinbefore described, by the dead-spindle on the tail-stock, this centering device and the work-holder constituting very effective means for positioning the work, while permitting the material to be located and removed quickly without the use of additional securing devices.

It should be noted here that the pitch of the threads of the complementary threaded members *l* and *d* and the pitch of the teeth of the cutter or tap *t* should be the same, in order that the member *l* may be advanced and threads formed properly by the cutter or tap.

The operation of a machine constructed in accordance with my present improvements, as herein shown and described, is as follows: It being understood that the jaws of the resistance-driver *d* are separated by properly turning the hand-wheel *h* so that the lead-screw and the thread-cutter may be placed in position the work should first be located on the work-rest W and the shank of the lead-screw inserted into the bushing of the rotary driving member 5. The work should then be brought up to the point of the tap on the lead-screw and said work-rest clamped or otherwise secured to the bed of the machine. The hand-wheel *h* should then be turned in the opposite direction to bring the jaws 20 and 20' into engagement with the lead-screw, the work being properly centered, of course, by means of the dead-spindle on the tail-stock. On the rotation of the lead-screw by the rotary driving member said screw will be turned, and the risistance-driving member *d*, fixed on the bed of the machine, will cause the lead-screw to advance the tap along or into work while the tap is rotating to thereby thread the work. It will be apparent that after the tap shall have passed entirely through the hub or other part to be threaded thereby the work may be removed by slipping it over the body and the shank of the lead-screw; but before the cutting of the final threads in the work the tap will have pushed the slidable centering device or dead-spindle out of the bore of the work to enable the tap to pass entirely through the latter and thread the same from end to end of its bore. To remove the work in the manner just described, the work-rest should, of course, be loosened and the hand-wheel *h* turned to withdraw the jaws 20 and 20' from the lead-screw, after which the work-rest may be slid to the right until the end of the shank 12 of the lead-screw is clear of the bushing in which it is supported, whereupon it and the work may be lifted away from the work-rest and the other members of the machine and the work slipped off from the shank 12.

Having described my invention, I claim—

1. In a screw-tapping machine, the combination, with a rotary driver, of a cutter-carrier in the form of a lead-screw having a reduced shank which is freely movable longitudinally in said driver; a thread-cutter on said carrier; a resistance-driver with which the lead-screw engages; a work-holder; and a dead-spindle movably mounted on the bed of the machine.

2. In a screw-tapping machine, the combination, with a live-spindle, of a tap-carrier having a tap at its forward end, a lead-screw of less diameter than the tap, and a reduced shank adapted to be fitted into, and gradually withdrawn from, said spindle; a separable nut with which the lead-screw part of said spindle engages; and a work-holder constructed to prevent the work from rotating while it is being threaded.

3. In a tapping-machine, the combination, with a rotary driving member, of a fixed carrier; an internally-threaded jaw on said carrier and constituting a resistance-driver; a lead-screw supported for rotation in unison with the rotary driving member and movable longitudinally relatively thereto and to said jaw, and having a shank of small diameter and a body portion of larger diameter externally screw-threaded to correspond to, and engage, the internal threads of the jaw; a tap secured to, and of larger diameter than, the lead-screw and having cutting-teeth of the same pitch as the threads of the lead-screw; and a work-holder for supporting the work and preventing rotation thereof.

4. In a tapping-machine, the combination, with a rotary driving member, of a fixed carrier; an internally-threaded jaw on said carrier and constituting a resistance-driver; a lead-screw supported for rotation in unison with the rotary driving member and movable longitudinally relatively thereto and to said jaw, and having a shank of small diameter and a body portion of larger diameter externally screw-threaded to correspond to, and engage, the internal threads of the jaw; a tap secured to, and of larger diameter than, the lead-screw and having cutting-teeth of the same pitch as the threads of the lead-screw; a work-holder for supporting the work and preventing rotation thereof; a tail-stock; and a slidable work-centering dead-spindle adapted to be pushed out of the work by the tap at the end of the tapping operation.

5. A tap-carrier provided with a short reduced portion at one end on which a removable tap is mounted, a lead-screw, and a reduced shank portion at the opposite end, the lead-screw being of less diameter than the tap.

WILLIAM W. TUCKER.

Witnesses:
FRED. J. DOLE,
HENRY BISSELL.